United States Patent [19]

Herman

[11] 3,848,793
[45] Nov. 19, 1974

[54] FRICTION WELDER

[75] Inventor: Stanley W. Herman, Nashville, Ind.

[73] Assignee: General Motors Corporation, Detroit, Mich.

[22] Filed: Aug. 24, 1973

[21] Appl. No.: 391,214

Related U.S. Application Data

[62] Division of Ser. No. 203,263, Nov. 30, 1971, Pat. No. 3,780,422.

[52] U.S. Cl.................. 228/2, 29/470.3, 156/580
[51] Int. Cl............................................ B23k 27/00
[58] Field of Search.......... 29/470.3; 228/2; 156/73, 156/580

[56] References Cited
UNITED STATES PATENTS

| | | | |
|---|---|---|---|
| 2,779,998 | 2/1957 | Bailey | 29/470.3 |
| 2,795,039 | 6/1957 | Hutchins | 29/470.3 |
| 3,393,851 | 7/1968 | Funk et al. | 228/2 |
| 3,702,169 | 11/1972 | Bonneville et al. | 228/2 |

Primary Examiner—J. Spencer Overholser
Assistant Examiner—Robert J. Craig
Attorney, Agent, or Firm—Charles R. White

[57] ABSTRACT

This friction welder has a rotatable head that drives an annular friction welding tool of a temperature stable material across adjacent faces of workpieces held in a fixture. The tool is axially loaded against the workpieces and the resulting heat of friction in an annular weld zone generally corresponding to the dimensions of the tool causes material in the zone to plasticize and form a bond wiped across the adjacent faces which solidifies to connect the workpieces as the rotating friction engagement of the tool with the workpieces is terminated.

3 Claims, 4 Drawing Figures

PATENTED NOV 19 1974　　3,848,793

FRICTION WELDER

This is a division of application Ser. No. 203,263, filed Nov. 30, 1971 now U.S. Pat. No. 3,780,422.

This invention relates to welding and more particularly to friction welders and to friction welding methods.

Friction welding machines and methods have been successfully employed for many years to bond and rigidly secure workpieces together. In the past few years the employment of friction welding has rapidly increased and with this advancement new and different machines and techniques are needed.

In one class of friction welding, two relatively rotating workpieces are brought together at an interface under load and the weld zone plasticizes to form a bond for the workpieces. As the relative rotation stops by employing braking means or by natural runout, the bond solidifies to rigidly secure the workpieces together. In another general classification of friction welding special movable tooling is employed which contacts and frictionally heats two workpieces until a bond is formed which solidifies on removal of the tooling to secure the workpieces together.

While these prior art friction welders and methods are generally satisfactory for their intended purposes they have been limited to special applications and generally have not been able to satisfactorily bond many arrangements of work. For example, the prior art friction welders have generally been unable to satisfactorily bond two workpieces together which have exposed faces located adjacent to one another. The present invention provides a new machine and technique which can frictionally weld many types of workpieces. With this invention the workpieces can be located in a side by side relationship and these workpieces can be readily welded together across an exposed and generally coplanar surface. In a preferred embodiment of this invention, a plurality of metallic workpieces can be simultaneously welded in a single operation without difficulty. This friction welder has a rotatable head in which there is secured special tooling that comprises a metallic welding bead or annulus of a material which is not adversely affected by the high temperatures produced during the friction weld process. This welding bead is brought under pressure into engagement with exposed faces of the metallic workpieces arranged side by side. In the illustrated embodiment of the invention, the workpieces comprise a plurality of planet gear spindles which have been inserted in a circular pattern through the side faces of the carrier of a planetary gear set. As the rotating welding bead is brought into contact with the side plate of the carrier assembly properly indexed with the circle defined by the spindles local heat buildup is generated to cause a wiping type friction weld to occur between the carrier and the spindles.

This invention thus provides a new and improved apparatus and method for joining workpieces disposed in a close, side by side relationship. In the preferred embodiments of the invention all spindles can be hard with no draw for manual or machine staking. Also, all spindles can be locked at the same time by a fast acting machine function to provide a material advantage in producing planetary type gear sets. In this invention there is an improved workpiece holder for holding a planetary gear set stationary during welding but which can be longitudinally moved between a loading-unloading position and a welding position.

These and other objects, features and advantages of this invention will become more apparent from the following detailed description and drawings in which.

Figure 1:
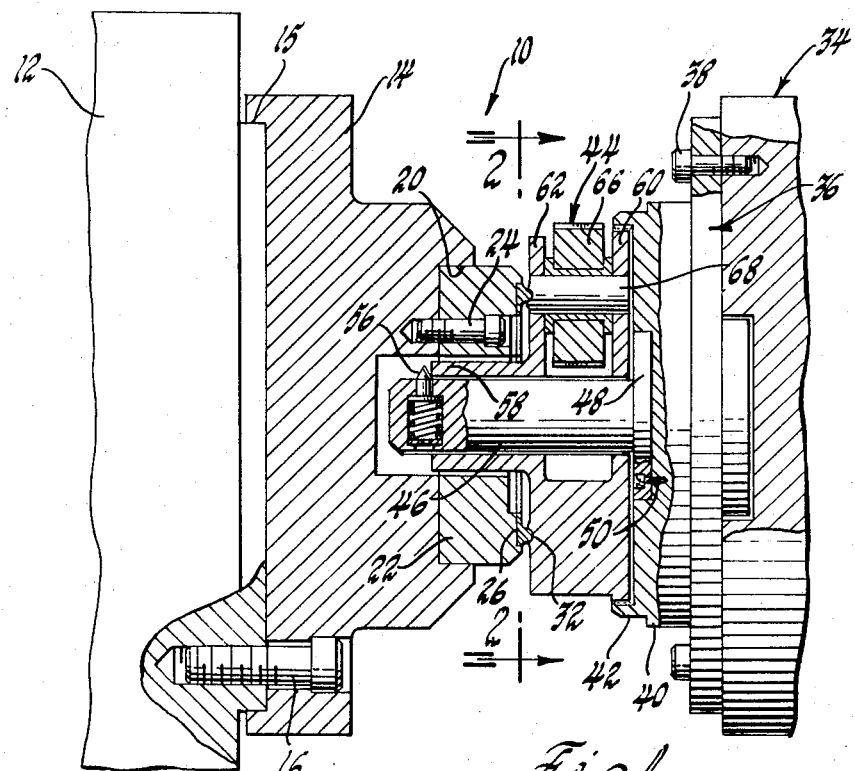
FIG. 1 is a side sectional view taken generally along lines 1—1 of FIG. 2 and shows a portion of a friction welder and workpieces mounted in the welder.

In FIG. 1 there is a friction welder 10 having a headstock with rotatable drive spindle 12 driven by a suitable motor as disclosed in U.S. application Ser. No. 778,720, filed Nov. 25, 1968 by E. S. Ditto et al, now U.S. Pat. No. 3,627,189. The drive spindle has a head member 14 mounted on a shoulder 15 of the spindle and is secured thereto by screws 16. The head member has an annular recess 20 that receives a cylindrical adapter 22 which is secured to the head member by screws 24. There is an annular welding tool 26 of a suitable temperature stable material, such as aluminum oxide, which is mounted in an annular recess 27 in adapter 22 and is secured therein by screws 28. This friction welding tool has an annular outwardly projecting bead 32 which is adapted to contact the work to be welded to accomplish a wiping type friction weld as will be explained below.

The welder 10 has a tailstock 34 which is fixed against rotation but can be moved back and forth on a longitudinal axis for loading, welding and unloading operations by suitable motor mechanisms such as disclosed in the above-identified patent application. The tailstock 34 has a fixture assembly 36 secured thereto by screws 38. This assembly has a workpiece support 40 which has a projecting annular shoulder 42 formed with internal teeth which mesh with teeth on the work which is here shown as a carrier 44 for the planet gears of a planetary gear set. The fixture assembly further comprises an elongated tubular support 46 that has a base 48 fitted into a recess in support 40 and is secured thereto by screws 50.

Disposed within the tubular support and adjacent to the free end thereof is a detent 56 which is normally biased into a projecting position into contact with the end of sleeve portion 58 of the carrier 44 to hold the carrier in loaded position on the tailstock.

Figure 2:
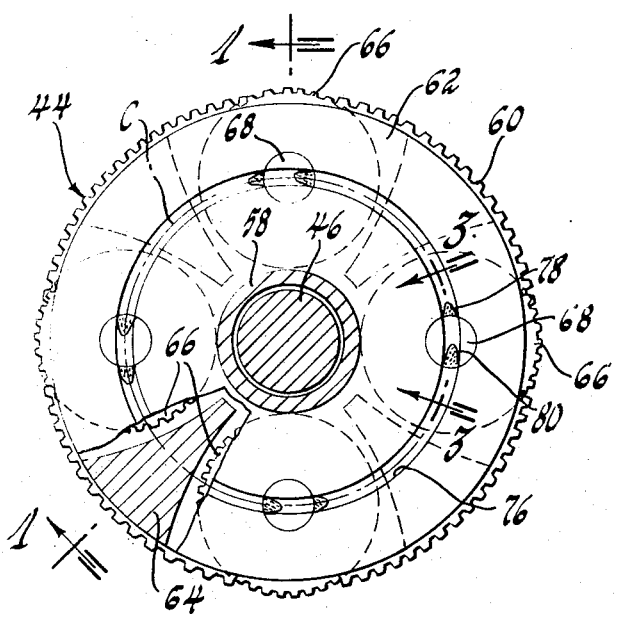
FIG. 2 is a front view, partly in section, taken generally along lines 2—2 of FIG. 1 showing the workpiece after friction welding.
Figure 3:
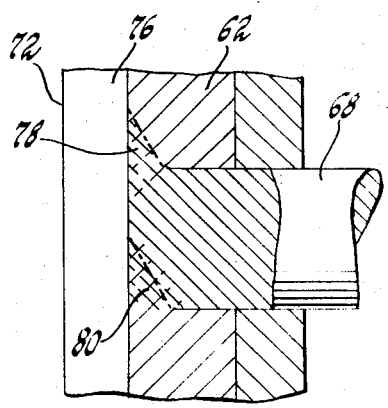
FIG. 3 is a view taken along lines 3—3 of FIG. 2.
Figure 4:
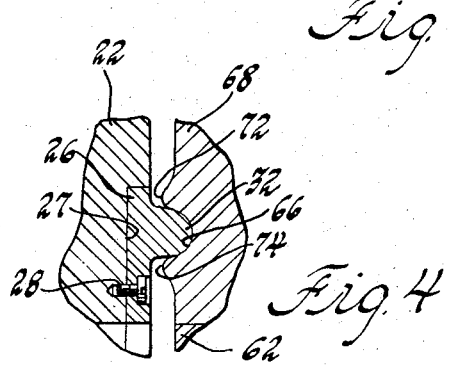
FIG. 4 is an enlarged view of a portion of FIG. 1.

As shown best in FIGS. 1 and 2 the carrier assembly is a one-piece metallic casting having sides 60, 62 connected by intermediate portions 64 that form pockets for a plurality of planet gears 66. Each of these gears is rotatably mounted on a separate metallic spindle 68 which extends between the sides 60 and 62. When in position in the carrier the flat end of each spindle preferably is coplanar with the exposed surface of the side 62. However, good welds can be accomplished if these surfaces are not coplanar.

For starting an operating cycle the tailstock is moved to a retracted position away from the headstock so that the carrier assembly 44 can be loaded onto the tubular support 46. When loaded, the teeth of the side plate 60 mesh with those of the workpiece support 40 and the detent 56 projects out of support 46 into engagement with the end of sleeve portion 58 of the carrier assembly to secure it in the loading position. The drive spindle 12 is rotatably driven by a flywheel such as disclosed in the above-identified application Ser. No. 778,720. The tailstock is then advanced longitudinally so that the rotating annular bead 32 frictionally engages the side plate 62 along the base circle C established by the spindles 68. The rotating tool 27 and the side plate are engaged under a load sufficient to cause the local heat buildup generally along this base circle. As the material of the base circle plasticizes, it is displaced forming annular beads 72 and 74 on either side of annular groove 76. The plasticized material mixes preferably in two weld areas 78 and 80 between each spindle 68 and the side plate 62 to thereby form two wiping type friction welds between each spindle and the side plate as the energy of rotation of the head member and parts rotating therewith is converted to frictional heat by the braking action at contact with the work. Thus the relative rotation is stopped by the braking effect as the rotational energy of the head is expended in the form of weldment heat. Preferably after the rotation has stopped the tailstock is moved to the retracted position for unloading so that the rotation of the tool can be restored for another operating cycle. In the retracted position the carrier assembly with the spindles welded into position can be easily removed and replaced by a new assembly to be welded.

If desired sufficient energy can be discharged from the flywheel to effect the welding and then the tailstock can be moved to the retracted position while the flywheel is still rotating. With this procedure the flywheel can be rapidly brought back to a welding speed with a minimum expenditure of energy. In both cases it will be appreciated that the bead 32 leaves substantially no deposit metal in the weld and the tool 26 can be utilized for many weld cycles before replacement.

This friction welder and process can be readily employed to weld other arrangement of workpieces. For example, plates of metal suitable for friction welding can be arranged in a close side by side relationship preferably contacting at a linear interface. The rotating welding tool of this invention can be advanced linearly, frictionally contacting the exposed surfaces of the plates above the interface, to plasticize and bond these workpieces together. In addition to metallic workpieces selected plastics can be welded with this welder and method.

While a preferred friction welder and friction welding method has been shown and described, other similar machines and methods will now be apparent to those skilled in the art. Therefore the scope and limitations of this invention are set forth in the following claims.

I claim:

1. A friction welder comprising a drive member headstock rotatable about an axis, a welder head rigidly secured to said rotatable drive member headstock for rotation therewith, a rotatable friction welding tool rigidly secured to said welder head, said tool having a workpiece contact portion of a temperature stable material radially spaced from said axis and extending axially from said welder head, a tailstock, holding means operatively connected to said tailstock for rigidly holding first and second workpieces together each workpiece having an outer planar face so that the outer faces thereof are aligned in a common plane, means for relatively moving said headstock and tailstock axially so that said contact portion of said rotating friction welding tool initially contacts and frictionally heats material in an annular track portion in the outer faces of said workpieces to a plasticized condition and intermixes the plasticized material of said workpieces to thereby effect a bond that subsequently solidifies to securely join said workpieces together when said contact portion of said rotating tool is moved from frictional engagement with said workpieces.

2. The friction welder defined in claim 1 wherein said workpiece contact portion comprises an annular bead concentric with said axis for simultaneous circular line contact with the outer faces of both of said workpieces.

3. A friction welder comprising a drive member headstock rotatable about an axis, a welder head rigidly secured to said rotatable drive member headstock for rotation therewith, said welder head having a flat mounting surface, a friction welding tool having an annular base, means removably securing said base to said flat mounting surface of said welder head, said tool having an axially projecting workpiece contact bead of a temperature stable material radially spaced from said axis and projecting axially from said base, a tailstock, holding means operatively connected to said tailstock for rigidly holding first and second workpieces together each workpiece having an outer planar face so that the outer faces thereof are aligned in a common plane, means for relatively moving said headstock and tailstock axially so that said bead of said friction welding tool initially simultaneously contacts both of said workpieces and frictionally heats an annular track portion of the outer faces of said workpieces to a plasticized condition when rotated by said drive member to thereby intermix the plasticized material of said workpieces to effect a bond therebetween that solidifies to securely join said workpieces together when said bead of said rotating tool is moved from frictional engagement with said workpieces.

* * * * *